United States Patent [19]

Carey

[11] Patent Number: 5,431,935
[45] Date of Patent: Jul. 11, 1995

[54] METHOD AND MEANS FOR COMPRESSING BACON SLABS

[75] Inventor: Joseph Carey, Essex, England

[73] Assignee: Townsend Engineering Company, Des Moines, Iowa

[21] Appl. No.: 265,009

[22] Filed: Jun. 24, 1994

[51] Int. Cl.$^6$ ............................ A22C 7/00; A23P 1/00
[52] U.S. Cl. .................................... 426/231; 425/135; 425/149; 425/150; 425/350; 426/513; 452/174
[58] Field of Search ..................... 426/231, 512, 513; 425/135, 149, 150, 350; 452/174

[56] References Cited

U.S. PATENT DOCUMENTS 3,114,644  12/1963  Peterson ............................ 426/513
5,364,302  11/1994  Shibata et al. ..................... 452/174

*Primary Examiner*—George Yeung
*Attorney, Agent, or Firm*—Zarley, McKee, Thomte, Voorhees & Sease

[57] ABSTRACT

A method and machine for compressing a bacon slab are disclosed. The machine comprises a frame with a support surface having front, rear and opposite side edges. Separate hydraulic actuated pressure elements are mounted on the frame adjacent at least the rear and opposite side edges of the supporting surface. A second hydraulic fluid pressure element is mounted on the frame over the support surface. Fluid pressure sensing elements and displacement and measuring means are on each of the first and second pressure elements. A computer circuit is operatively connected to the first and second pressure elements, the fluid pressure sensing elements, and the linear displacement and measuring elements. The computer circuit includes a control to move the first and second pressure means to measure the length, width and height of the bacon slab by moving those components into contact with the bacon slab. The control has imposed thereon the dimensions of a slab having a predetermined package size, a maximum pressure to which the bacon slab can be compressed, and a calculation circuit to compute the amount of compression required to compress the bacon slab to that package size.

4 Claims, 4 Drawing Sheets

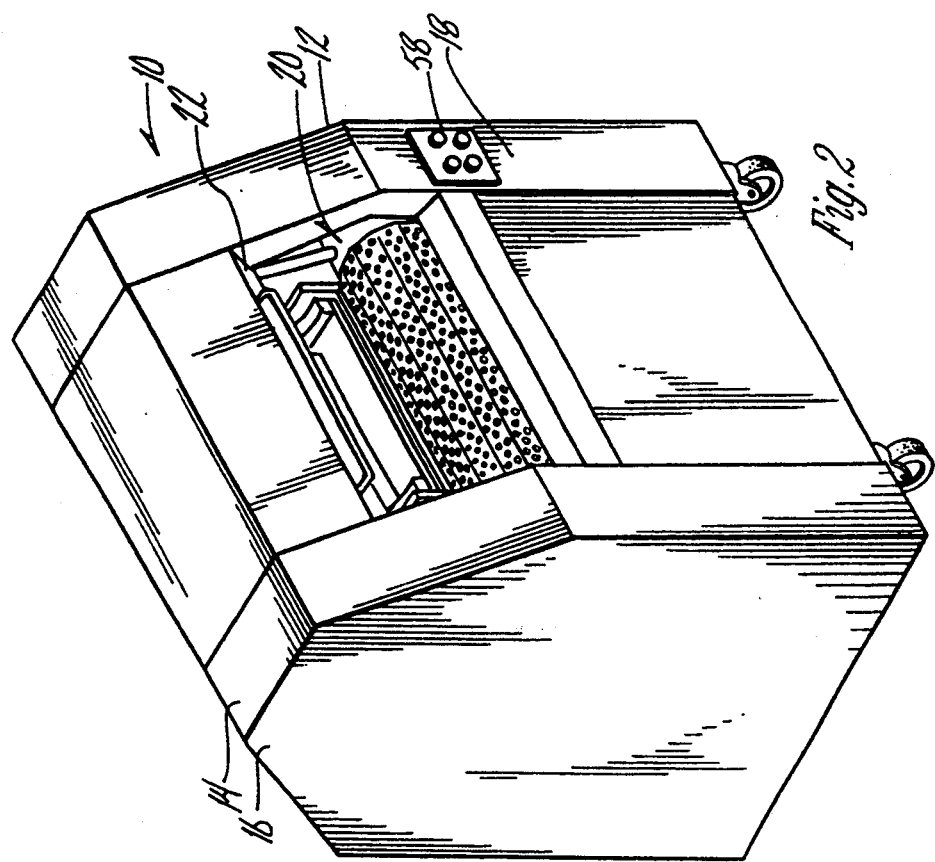
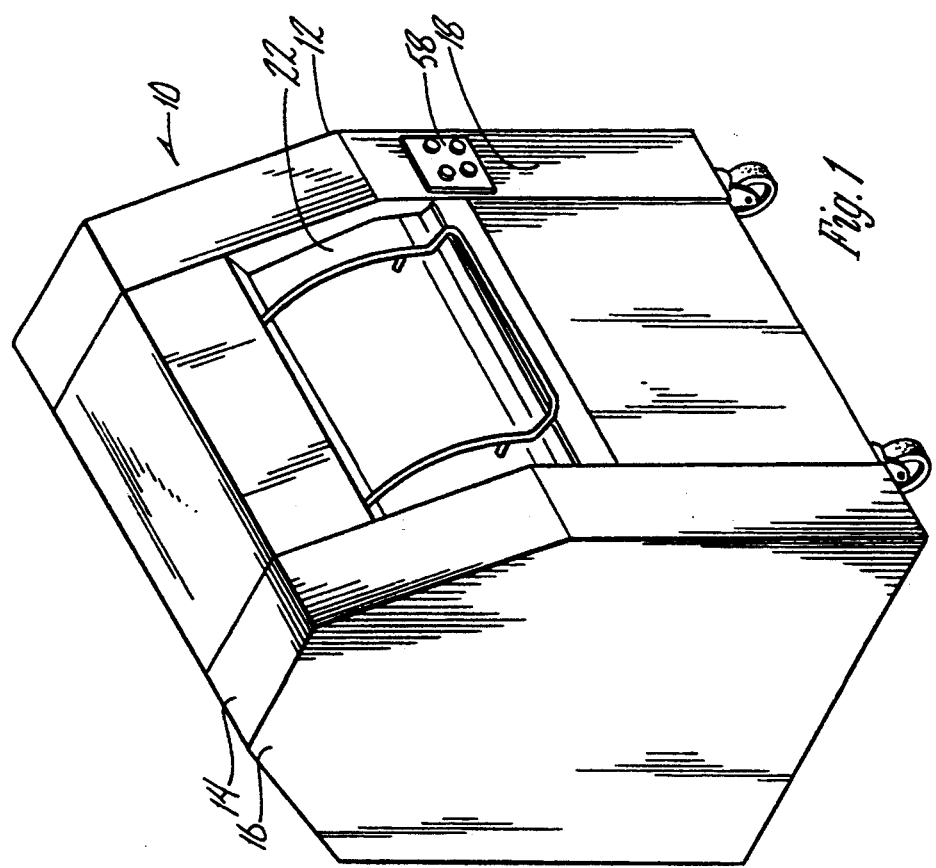

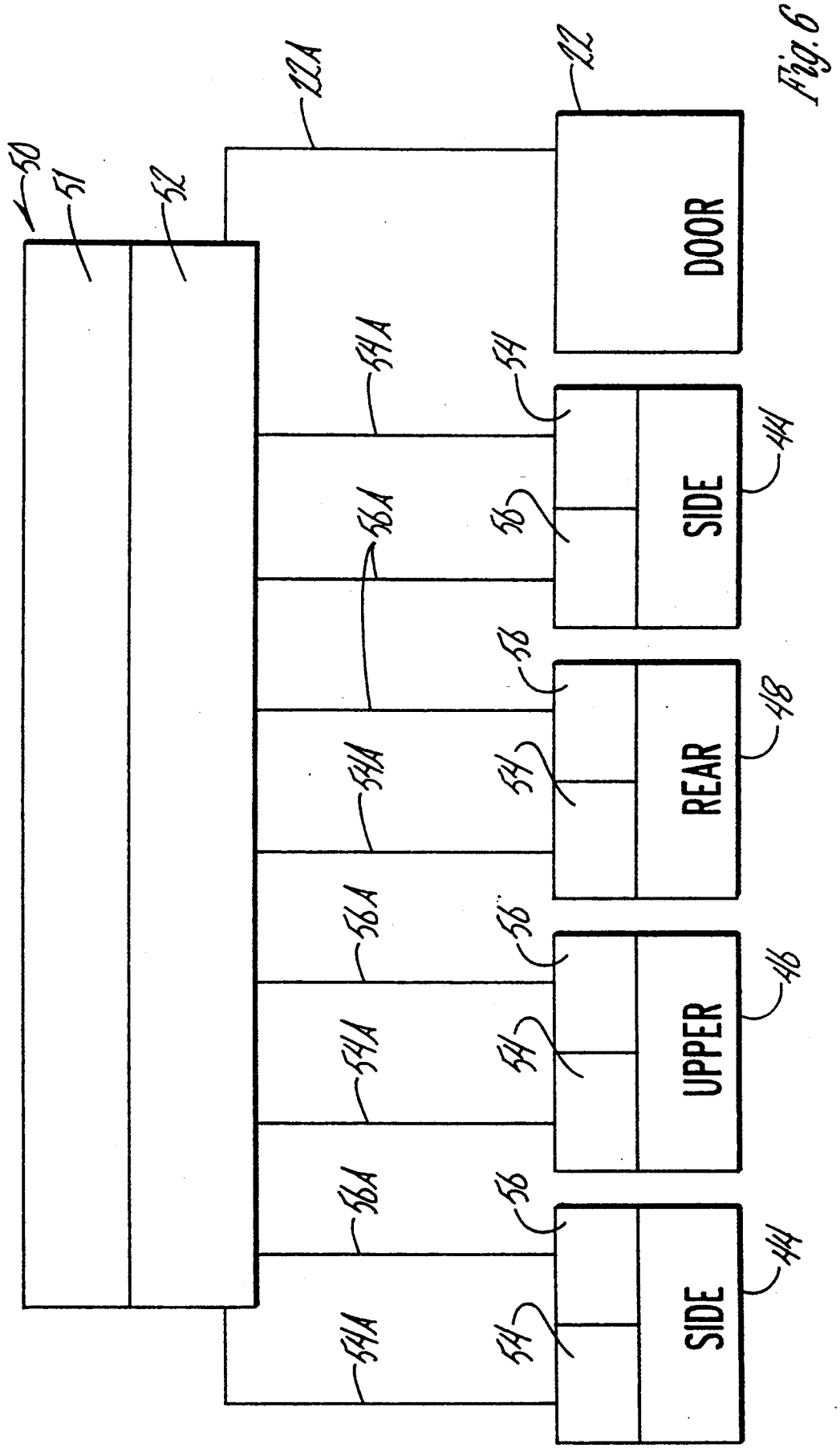

METHOD AND MEANS FOR COMPRESSING BACON SLABS

BACKGROUND OF THE INVENTION

It is desirable to compress bacon slabs into predetermined sizes to facilitate packaging requirements. However, existing machines which are capable of compressing bacon often subject the bacon to excessive compressive forces which damages the quality of the meat. In addition, these machines do not have the ability to easily compress bacon slabs to accommodate different packaging requirements. Further, they do not have the ability to eject an oversize slab of bacon when it cannot be safely compressed into the desired package size.

It is therefore a principal object of this invention to provide a method and means for compressing bacon slab which will not subject the slab to excessive compressive forces.

A further object of this invention is to provide a method and means for compressing bacon slabs which will allow limitations on pressure to control the compression process rather than to allow the final size of the slab to be the controlling factor.

A still further object of the invention is to provide a method and means for compressing a bacon slab wherein an oversized bacon slab which cannot be compressed to the desired package size will be rejected so as to prevent it from being overly compressed.

A still further object of this invention is to provide a method and means for compressing a bacon slab which will permit the package size of the process to be easily adjusted.

These and other objects will be apparent to those skilled in the art.

SUMMARY OF THE INVENTION

The method of compressing a bacon slab comprises the steps of providing a separate hydraulic activated fluid pressure means to be in association with a support surface for hydraulically compressing a slab of bacon on the surface from two lateral sides, the rear, and the top of the slab. Fluid pressure sensing elements, and linear displacement and measuring means are provided on each of the pressure means. The pressure means, the fluid pressure sensing means, and the linear displacement and measuring means are connected to a computer circuit which is programmed to move the pressure means to measure the length, width and height of the bacon slab by moving the pressure means into contact with the bacon slab. After the measurement of the slab is thus taken, the computer circuit, which has been programmed to produce a finished compressed bacon slab of a predetermined package size, computes the amount of compression required to compress the bacon slab to the package size. The computed compression is then compared to a predetermined maximum pressure to which the bacon slab can be compressed. If the amount of pressure is less than the predetermined maximum pressure, the slab of bacon is compressed to the package size. If the amount of computed pressure is greater than the predetermined maximum pressure, the bacon slab is rejected from the supporting surface.

The machine for compressing bacon slabs has a frame including a support surface which has front, rear and opposite side edges. Separate hydraulic actuated first pressure means are mounted on the frame adjacent at least the rear and opposite side edges of the support surface. A second hydraulic fluid pressure means is mounted on the frame over the support surface. Fluid pressure sensing elements, and displacement and measuring means are on each of the first and second fluid pressure means. A computer circuit is operatively connected to the first and second pressure means, the fluid pressure sensing means, and the linear displacement and measuring means. The computer circuit includes a control means to move the first and second pressure means to measure the length, width and height of the bacon slab by moving those components into contact with the bacon slab. The control means has imposed thereon the dimensions of a bacon slab having a predetermined package size, a maximum pressure to which the bacon slab can be compressed, and a calculation circuit to compute the amount of compression required to compress the bacon slab to the package size. The control means thereupon may cause the first and second fluid pressure means to compress the slab to the package size if the computed amount of compression required to compress the slab is less than the predetermined maximum pressure, and further includes means to eject the bacon slab from the support surface if the computed amount of compression is less than the predetermined maximum pressure.

BRIEF DESCRIPTION OF THE DRAWINGS

FIG. 1 is a perspective view of a bacon slab compression apparatus with the access door in a closed condition;

FIG. 2 is a view similar to that of FIG. 1 but with the door of the machine being open to either receive or reject a bacon slab;

FIG. 6 is a schematic drawing showing how the operating components of the machine are connected to the computer circuitry.

DESCRIPTION OF THE PREFERRED EMBODIMENT

Figure 3:
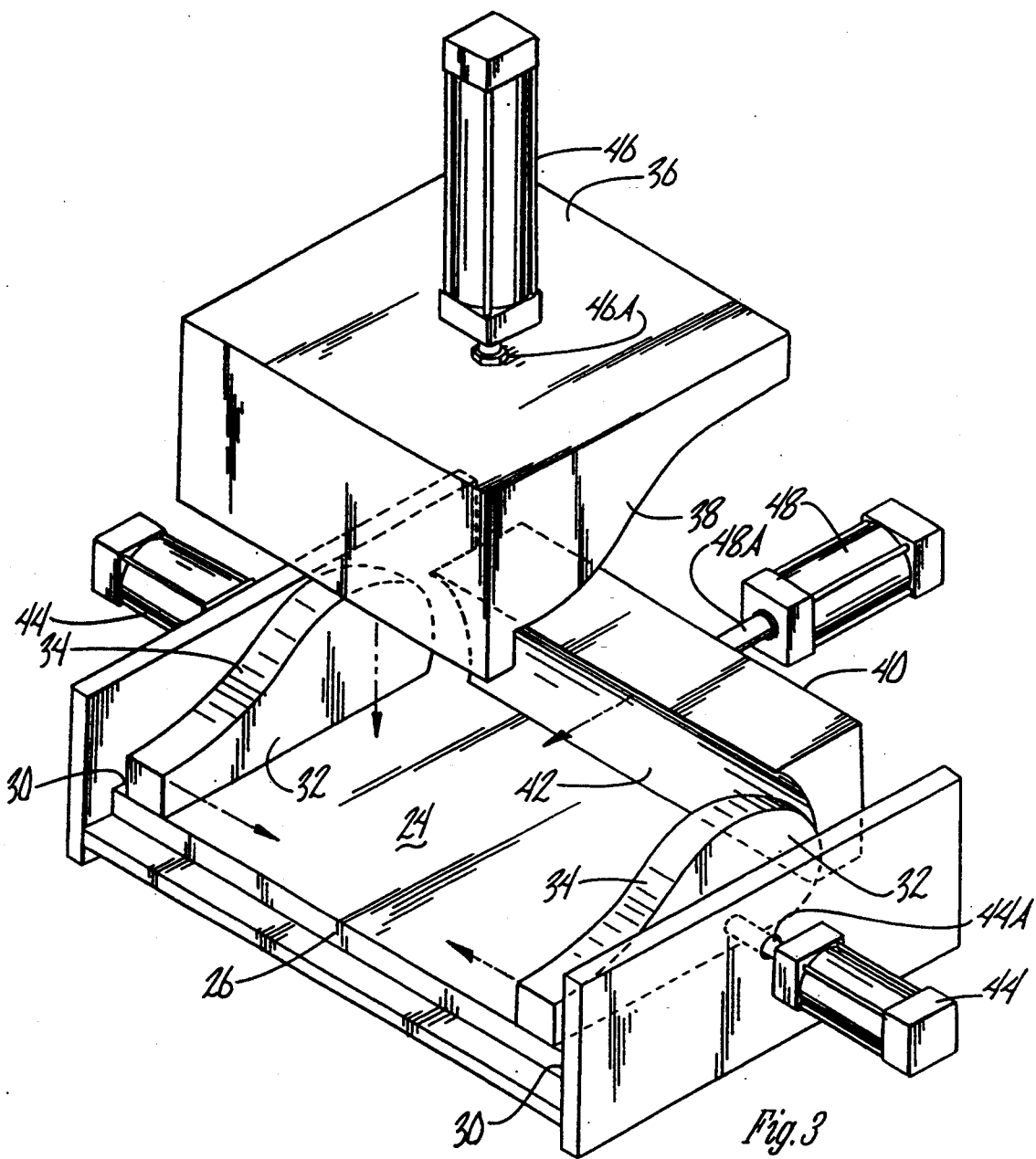
FIG. 3 is an enlarged scale schematic view showing the support surface for the bacon slab and the various compressive elements for compressing the bacon slabs.

A bacon slab compressing machine 10 has a frame 12, top 14, side 16 and front 18 (FIGS. 1 and 2). An internal compartment 20 is located within machine 10 and has a closure door 22 operatively secured thereto.

Within compartment 20 is mounted on frame 12 an operating surface 24 which has a front edge 26, rear edge 28, and side edges 30. Side dies 32 extend across operating surface 24 from the front edge to the rearward edge and are slidably mounted on the surface and movable in a lateral direction across the operating surface. The side dies 32 each have an arcuate die surface 34.

An upper die 36 is movably mounted on frame 12 above operating surface 24 and has an arcuate die surface 38 which is complimentary in shape to the die surface 34 on side dies 32.

A rear die 40 is movably mounted on frame 12 adjacent the rearward edge 28 of the operating surface 24.

Rear die 40 has an arcuate die surface 42 that is complimentary in shape to the rearward portion of side dies 32.

Side hydraulic cylinders 44 are mounted within machine 10 and are operatively connected to the side dies 32 by extendable rods 44A. Similarly, a top hydraulic cylinder 46 is mounted within machine 10 and is operatively connected by piston rod 46A to the upper die 36.

Rear hydraulic cylinder 48 is similarly movably mounted within machine 10 adjacent the rearward edge 28 of surface 24 and is connected by piston rod 48 to the rear die 40.

With reference to FIG. 6, a computer mounted within machine 10 or positioned remotely therefrom has a memory circuit 51 and a control circuit 52. Each of the cylinders 44, 46 and 48 have pressure sensors 54 connected by leads 54A to control circuit 52. Similarly, each of the cylinders 44, 46 and 48 have linear transducers 56 associated therewith which are connected to control circuit 52 by leads 56A. Pressure sensors 54 are adapted to reflect the hydraulic or fluid pressure within the respective cylinders. Similarly, the linear transducers 56 are adapted to sense the linear displacement of the respective piston rods and the respective dies to which they are attached.

The door 22 is pivotally mounted (not shown) to the front 18 of machine 10 and is adapted to be open when loading or unloading the machine. Control circuit 52 is operatively connected by lead 22A to door 22 to selectively open and close the door as required.

Suitable controls 58 are mounted on machine 10 to selectively control the machine, to turn it on and off, and to actuate the hydraulic pump (not shown) to actuate the cylinders 44, 46 and 48.

In operation, the door 22 is opened either manually or by one of the controls 58. A slab of bacon 60 is placed on operating surface 24 with the thicker part of the slab conforming generally to the overall configuration of the side dies 32. The door 22 is then closed and the hydraulic circuit (not shown) associated with hydraulic cylinders 44, 46 and 48 is actuated to move the dies 32, 36 and 40 into touching contact with the slab 60. The control 52 causes the movement of the dies to cease when they engage the slab 60 sufficiently to create an internal hydraulic reverse pressure in the cylinders in the order of 30 p.s.i. The transducers 56 signal the computer control circuit 52 as to the linear displacement of each of the dies.

Meanwhile, the computer 50 has been preprogrammed to identify the predetermined package size of the compressed slab 60. Further, the computer has been preprogrammed to limit the compressive pressure exerted on the slab so that in no event will any of the dies exert a compressive pressure against the slab in excess of the predetermined selected maximum pressure which may be in the order of 800 p.s.i.

Figure 4:
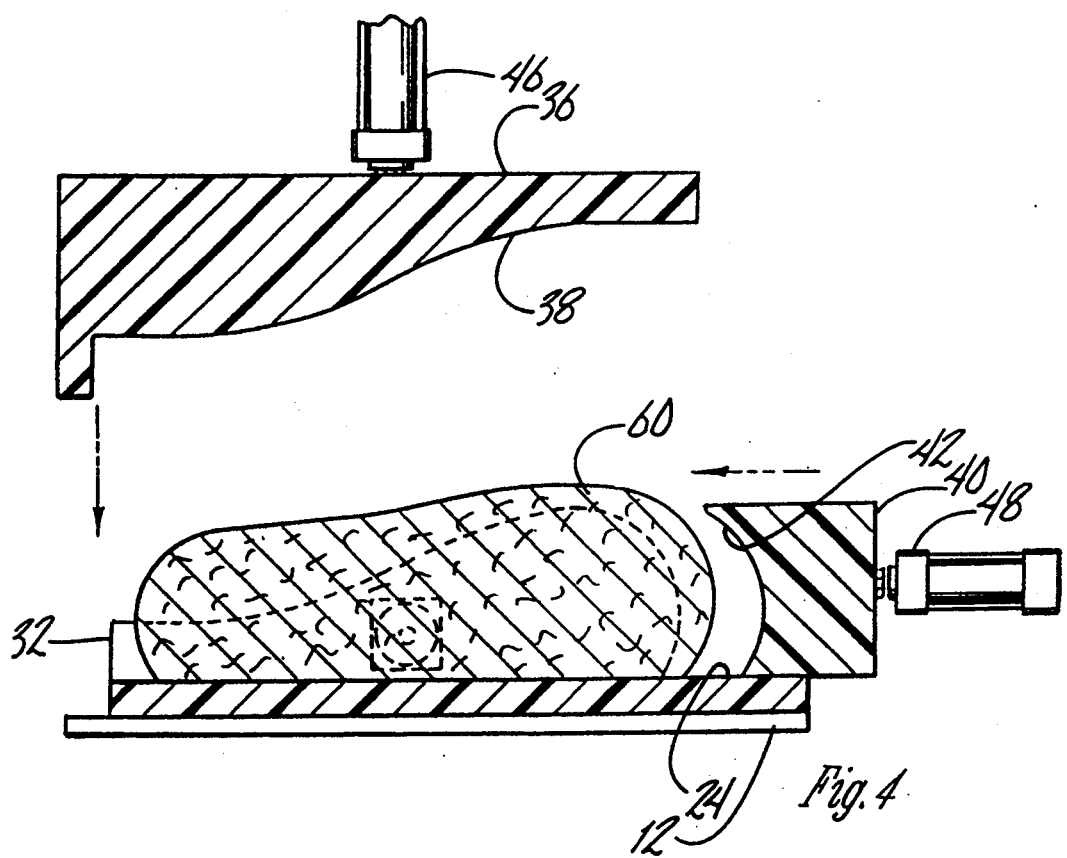
FIG. 4 is a cross-sectional view taken on a vertical plane extending from the forward edge to the rearward edge of the support surface.
Figure 5:
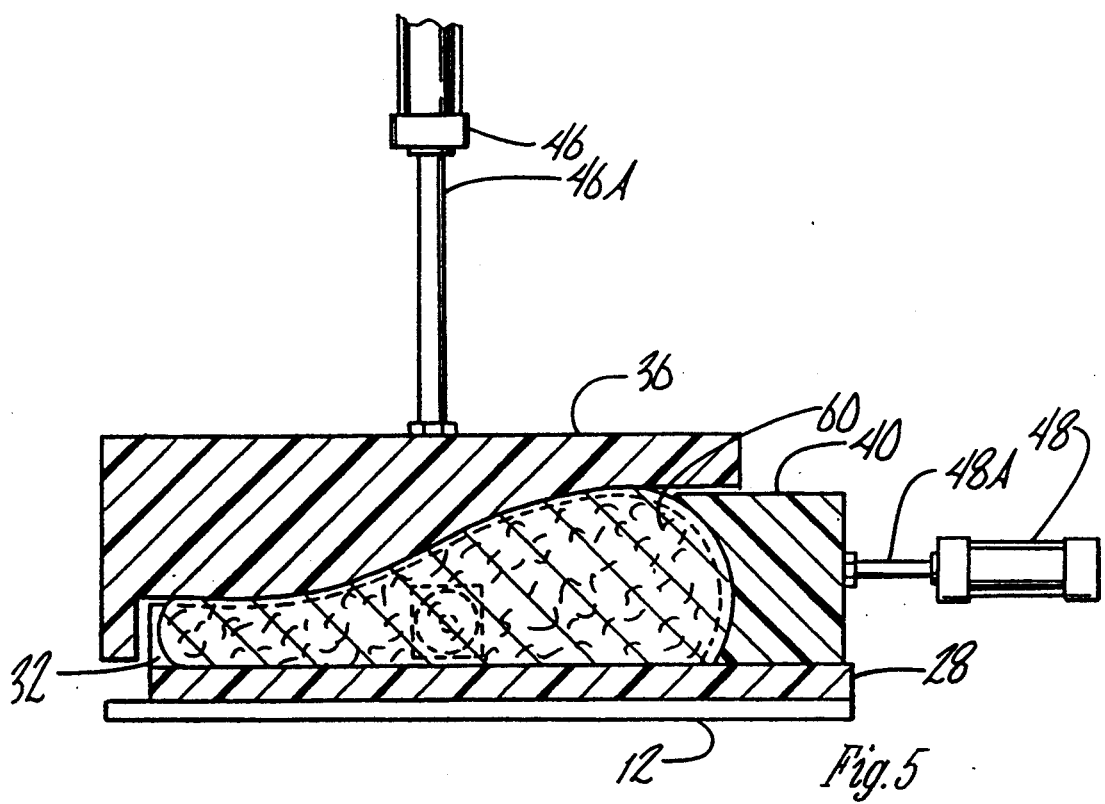
FIG. 5 is a cross-sectional view similar to that of FIG. 4 but shows the compressive elements compressing a slab of bacon.

When the respective dies have initially engaged the slab, the movement of the dies ceases and the computer, utilizing a calculation circuit therein, calculates whether the slab 60 can be compressed to the predetermined package size without exceeding the predetermined maximum compressive pressure set in the computer. The computer determines what compressive pressure would be required to so compress the slab to the desired package size. If that computed figure is less than the preset maximum pressure, the control circuit 52 of the computer leads the machine into its second stage wherein the respective cylinders and dies compress the slab into the shape of FIG. 5 from the initial shape of FIG. 4.

However, if the computer senses at the end of the initial stage that it would require a compressive force in excess of a predetermined maximum compressive force to be permitted, the second stage described above will not be forthcoming. Rather, the control circuitry 52 of the computer will cause the side dies 32 to be retracted by cylinders 44, and will cause the upper die 36 to be retracted by the cylinder 46. The rear cylinder 48 will then push the slab forwardly across the operating surface 24 and out of the open door 22 into a suitable depository so that the over sized slab can be used in a different operation. The door 22 is opened by the control circuit 52 in such situations.

The control circuit 52 can have the predetermined maximum pressure imposed thereon also connected to a control switch to prevent any compressive force over the predetermined maximum from being exerted on the slab. The control switch will simply prevent the dies from experiencing anymore linear displacement whereupon no additional pressure can be applied to the slab.

The foregoing process will insure that the ends of the slab are compressed to a perpendicular configuration with respect to surface 24 so that the ends are suitably "squared" to permit full slices to be extracted from the slab during the slicing operation. It should be noted that the initial movement of the side dies 32 towards an engaging relationship with the ends of the slab will have a tendency to center the slab on the surface 24 if the slab has not been properly centered longitudinally.

From the foregoing, it is seen that the method and operation of the present invention will achieve at least all of its stated objectives.

I claim:

1. The method of compressing a bacon slab, comprising, providing separate hydraulic activated fluid pressure means in association with a support surface for hydraulically compressing a slab of bacon on said support surface from two lateral sides, the rear, and the top of said slab of bacon, associating fluid pressure sensing elements and linear displacement and measuring means on each of said pressure means, connecting said pressure means, said fluid pressure sensing means, and said linear displacement and measuring means to a computer circuit, programming said computer circuit to move said pressure means to measure the length, width and height of said bacon slab by moving said pressure means into contact with said bacon slab, and taking such measurement, programming said computer circuit to produce a finished compressed bacon slab of a predetermined package size, programming said computer circuit to compute the amount of compression required to compress said bacon slab to said package size, comparing said computed amount of compression to a predetermined maximum pressure to which said bacon slab can be compressed, and compressing said slab of bacon to said package size if said amount of pressure is less than said predetermined maximum pressure.

2. The method of compressing a bacon slab, comprising, providing separate hydraulic activated fluid pressure means in association with a support surface for hydraulically compressing a slab of bacon on said support surface from two lateral sides, the rear, and the top of said slab of bacon, associating fluid pressure sensing elements and linear displacement and measuring means on each of said pressure means, connecting said pressure means, said fluid pressure sensing means, and said linear displacement and measuring means to a computer circuit, programming said computer circuit to move said pressure means to measure the length, width and height of said bacon slab by moving said pressure means into contact with said bacon slab, and taking such measurement, programming said computer circuit to produce a finished compressed bacon slab of a predetermined package size, programming said computer circuit to compute the amount of compression required to compress said bacon slab to said package size, comparing said computed amount of compression to a predetermined maximum pressure to which said bacon slab can be compressed, and ejecting said bacon slab from said support surface if said amount of pressure is more than said predetermined maximum pressure.

3. A machine for compressing bacon slabs, comprising a frame including a support surface, said support surface having front, rear, and opposite side edges, separate hydraulic actuated first fluid pressure means mounted on said frame adjacent at least the rear and opposite side edges of said support surface, a second hydraulic actuated fluid pressure means mounted on said frame over said support surface, fluid pressure sensing elements, and linear displacement and measuring means on each of said first and second fluid pressure means, a computer circuit means operatively connected to said first and second pressure means, said fluid pressure sensing means, and said linear displacement and measuring means, said computer circuit including a control means to move first and second pressure means to measure the length, width and height of said bacon slab by moving said first and second pressure means into contact with said bacon slab, said control means having imposed thereon the dimensions of a bacon slab having a predetermined package size, a maximum pressure to which said bacon slab can be compressed, and a calculation circuit to compute the amount of compression required to compress said bacon slab to said package size, whereupon said control means will cause said first and second fluid pressure means to compress said slab to said package size if the computed amount of compression required to compress the bacon slab to said package size is less than said predetermined maximum pressure.

4. The apparatus of claim 3 wherein said control means will actuate at least one of said first pressure means to eject said bacon slab from said support surface if said computed amount of compression required to compress said bacon slab to said package size is greater than said predetermined maximum pressure.

* * * * *